(12) United States Patent
Chung et al.

(10) Patent No.: US 12,488,469 B2
(45) Date of Patent: Dec. 2, 2025

(54) SEGMENTATION METHOD FOR LIPID DROPLET IN PATHOLOGICAL SLICE IMAGE

(71) Applicant: NATIONAL CHENG KUNG UNIVERSITY, Tainan (TW)

(72) Inventors: Pau-Choo Chung, Tainan (TW); Hung-Wen Tsai, Tainan (TW); Jyun-Sin Wu, Tainan (TW); Yu-Hsuan Lin, Tainan (TW); Kuo-Sheng Cheng, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 525 days.

(21) Appl. No.: 18/173,042

(22) Filed: Feb. 22, 2023

(65) Prior Publication Data
US 2023/0289975 A1  Sep. 14, 2023

(30) Foreign Application Priority Data

Mar. 8, 2022 (TW) .................................. 111108368

(51) Int. Cl.
*A61B 5/00* (2006.01)
*G06T 7/12* (2017.01)
(Continued)

(52) U.S. Cl.
CPC ............... *G06T 7/12* (2017.01); *G06T 7/155* (2017.01); *G16H 30/40* (2018.01);
(Continued)

(58) Field of Classification Search
CPC ............ G06T 7/12; G06T 7/155; G16H 30/40
See application file for complete search history.

(56) References Cited

U.S. PATENT DOCUMENTS 10,957,045 B2 *  3/2021  Chen .................... G06V 10/454
2015/0247149 A1   9/2015  Feldstein et al.
(Continued)

FOREIGN PATENT DOCUMENTS

CN    105654107 A    6/2016
CN    111724401 A    9/2020
(Continued)

OTHER PUBLICATIONS

Sheneman et al, Deep learning classification of lipid droplets in quantitative phase images, Apr. 5, 2021, https://doi.org/10.1371/journal.pone.0249196, 25 pages (Year: 2021).*
(Continued)

*Primary Examiner* — Mohammed H Zuberi
(74) *Attorney, Agent, or Firm* — CKC & Partners Co., LLC (57) ABSTRACT

The present invention provides a method for segmenting lipid droplets that includes: inputting a pathological slice image into a machine learning model to output a region map and an boundary map, in which the region map includes multiple regional probability values, and the boundary map includes multiple boundary probability values; and segmenting multiple lipid droplets from the pathological slice image according to the regional probability values and the boundary probability values.

15 Claims, 7 Drawing Sheets
(1 of 7 Drawing Sheet(s) Filed in Color)

(51) Int. Cl.
 G06T 7/155 (2017.01)
 G16H 30/40 (2018.01)
(52) U.S. Cl.
 CPC .............. *G06T 2207/20021* (2013.01); *G06T 2207/20036* (2013.01); *G06T 2207/20076* (2013.01); *G06T 2207/20081* (2013.01); *G06T 2207/20084* (2013.01); *G06T 2207/30084* (2013.01); *G06T 2207/30204* (2013.01)

(56) References Cited

U.S. PATENT DOCUMENTS

| | | | |
|---|---|---|---|
| 2021/0019890 A1* | 1/2021 | Chen | G06T 7/11 |
| 2021/0121122 A1* | 4/2021 | Melcher | A61B 5/742 |
| 2021/0239618 A1* | 8/2021 | Cheng | G06T 5/70 |
| 2021/0264589 A1* | 8/2021 | Jacob | G06T 7/194 |
| 2023/0021110 A1* | 1/2023 | Tsai | G06T 7/12 |
| 2024/0320562 A1* | 9/2024 | Ba | G06V 10/774 |

FOREIGN PATENT DOCUMENTS

| | | |
|---|---|---|
| CN | 113570633 A | 10/2021 |
| EP | 2707055 B1 | 10/2019 |
| TW | 202141521 A | 11/2021 |

OTHER PUBLICATIONS

Guo et al, Liver Steatosis Segmentation With Deep Learning Methods, Apr. 2019, IEEE, 4 pages (Year: 2019).*
Wang et al, Multi-Path Dilated Residual Network for Nuclei Segmentation and Detection, 2019, https://pmc.ncbi.nlm.nih.gov/articles/PMC6562946/, 19 pages (Year: 2019).*
David E. Kleiner et al., "Design and Validation of a Histological Scoring System for Nonalcoholic Fatty Liver Disease" Jun. 2005, pp. 1313-1321, vol. 41, No. 6, Hepatology.
Roberta Forlano et al., "High-Throughput, Machine Learning-Based Quantification of Steatosis, Inflammation, Ballooning, and Fibrosis in Biopsies From Patients With Nonalcoholic Fatty Liver Disease" Aug. 2020, pp. 2081-2090, vol. 18, No. 9, Clinical Gastroenterology and Hepatology.
Xiaoyuan Guo et al., "Liver Steatosis Segmentation With Deep Learning Methods" Jul. 15, 2020, pp. 1-11, PubMed Central.
Mousumi Roy et al., "Deep-learning-based accurate hepatic steatosis quantification for histological assessment of liver biopsies" Jul. 13, 2020, pp. 1367-1383, United States and Canadian Academy of Pathology.
Songtao Liu et al., "Receptive Field Block Net for Accurate and Fast Object Detection" 2018, pp. 1-16, ECCV.
Alexandros Arjmand et al., "Training of Deep Convolutional Neural Networks to Identify Critical Liver Alterations in Histopathology Image Samples" Dec. 19, 2019, pp. 1-19, MDPI.
Luke Sheneman et al., "Deep learning classification of lipid droplets in quantitative phase images," PLOS One, vol. 16, No. 4, Apr. 5, 2021.

* cited by examiner

SEGMENTATION METHOD FOR LIPID DROPLET IN PATHOLOGICAL SLICE IMAGE

RELATED APPLICATIONS

This application claims priority to Taiwan Application Serial Number 111108368 filed Mar. 8, 2022, which is herein incorporated by reference.

BACKGROUND

Field of Invention

The present disclosure relates to a method for segmenting lipid droplets from a pathological slice image.

Description of Related Art

In clinical practice, pathologists use hematoxylin and eosin (H&E) staining to visualize different structures in tissue slides. Several indicators for the diagnosis of nonalcoholic fatty liver disease (NAFLD) have also been proposed, among which steatosis is one of the most important indicators. When steatosis occurs, excess fat is stored as lipid droplet in the liver cells. On H&E staining, the lipid droplets are manifest as white bubbles. In the conventional diagnosis method, doctors observe the density and type of the lipid droplets through a microscope to analyze the degree or type of steatosis. This process is not only crude, time-consuming, and subjective, but also likely to be wrong. Therefore, there is a pressing need for automated lipid droplet quantification systems to assist the doctor in performing the diagnosis process.

SUMMARY

Embodiments of the present disclosure provide a segmenting method for a pathological slice image. The method is performed by a computer system and includes: inputting the pathological slice image into a machine learning model to output a region map and a boundary map with respect to multiple lipid droplets, in which the region map includes multiple region probabilities, and the boundary map includes multiple boundary probabilities; and segmenting the lipid droplets from the pathological slice image according to the region probabilities and the boundary probabilities.

In some embodiments, the machine learning model is a convolutional neural network having a U-net structure including down-sampling and up-sampling. The convolutional neural network includes a receptive field block at a bottom layer of the U-net structure. The receptive field block includes multiple convolution kernels, and at least one of the convolution kernels is a dilation convolution kernel.

In some embodiments, the machine learning model includes a first branch for outputting the region map and a second branch for outputting the boundary map. The method further including: using a marked pathological slice image to train the first branch; and calculating a result of a morphology dilation process of the marked pathological slice image minus a result of a morphology erosion process of the marked pathological slice image to train the second branch.

In some embodiments, the step of segmenting the lipid droplets from the pathological slice image includes: determining if the region probabilities are greater than or equal to a first threshold to generate a mask; using the boundary probabilities and the region probabilities at respective same locations to calculate multiple center scores and gradients; generating multiple markers based on the center scores; and performing a watershed algorithm according to the mask, the gradients, and the markers.

In some embodiments, the segmenting method further includes: calculating an average of the boundary probabilities within one of the lipid droplets as an boundary score of the one of the lipid droplets; and deleing the one of the lipid droplets if the boundary score is less than a third threshold.

From another aspect, embodiments of the present disclosure provide an electrical device including a memory storing multiple instructions and a processor configured to execute the instructions to perform the segmentation method mentioned above.

From another aspect, embodiments of the present disclosure provide a non-transitory computer readable storage media storing multiple instructions which are executed by a computer system to perform the segmentation method.

BRIEF DESCRIPTION OF THE DRAWINGS

The patent or application file contains a least one drawing executed in color. Copies of this patent or patent application publication with color drawing(s) will be provided by the Office upon request and payment of the necessary fee.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

In the embodiment, H&E-stained liver paraffin sections were scanned into whole slide images (WSIs) using a Leica® scanner with a 40× objective magnification setting. Each WSI was then divided into tens of thousands of non-overlapping patches with a size of 512×512 pixels. Each divided patch is referred to as a pathological slice image hereinafter. However, any other suitable equipment may be used to obtain the WSI with respect to any organs or tissues in other embodiments. The size of the pathological slice images and whether they are overlapped are not limited in the disclosure.

Figure 1:
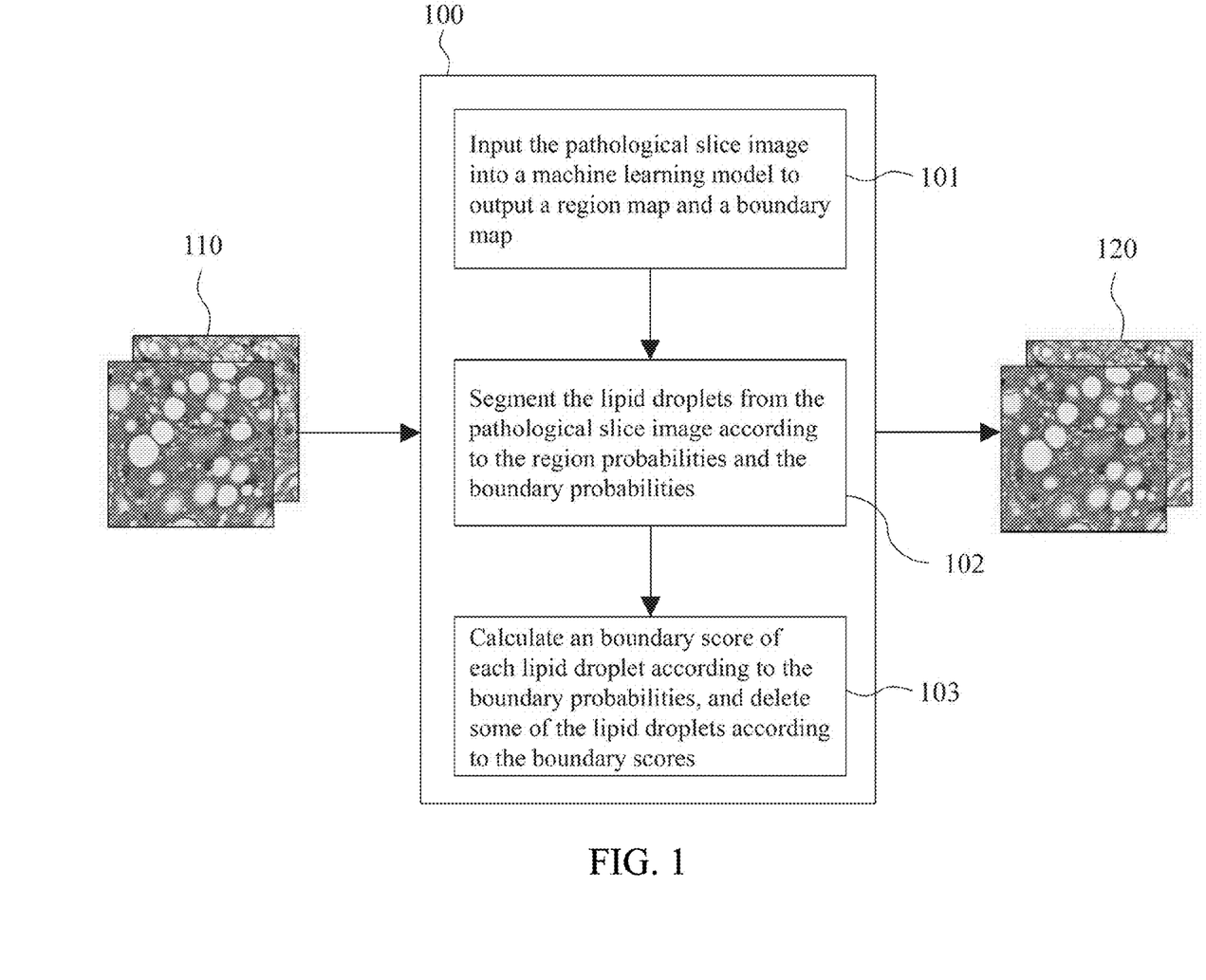
FIG. 1 is a flow chart of a method for segmenting lipid droplets from the pathological slice image in accordance with an embodiment.

FIG. 1 is a flow chart of a method for segmenting lipid droplets from the pathological slice image in accordance with an embodiment. Referring to FIG. 1, a method 100 is to segment lipid droplets from a pathological slice image 110 to generate a result 120 in which green lines represent the segmented lipid droplets. The method 100 is performed by any suitable computer system such as a personal computer, a laptop, or a server. The method 100 includes steps 101-103 which will be described in detailed below.

In step 101, the pathological slice image 110 is inputted into a machine learning model to output a region map and a boundary map. The machine learning model is a convolutional neural network having a U-net structure in the embodiment. For example, referring to FIG. 2, the blocks in the diagram are feature maps. The numbers above the feature maps indicate "length×width×depth". For example, the length, the width, and the depth of a feature map 210 are "512", "512", and "16" respectively, and so on. The output of the network includes a region map 231 and a boundary map 232, and the size of the both is 512×512×1. The region map 231 includes multiple region probabilities indicating the probability of each pixel being classified as a lipid droplet region. The boundary map 232 includes multiple boundary probabilities indicating the probability of each pixel being classified as a lipid droplet boundary. The right arrows besides the region map 231 and the boundary map 232 are convolution layers including 1×1 convolution kernel and Sigmoid functions. The remaining right arrows are convolution layers including 3×3 convolution kernels, strides of 1, batch normalization (BN) and activation (AC) which is Mish function in the embodiment. The down-right arrow is down-sampling which may be implemented as a convolution kernel of 3×3 while the stride is set to be 2 for the purpose of down-sampling. The down-right arrow may also include BN and AC. The up arrows are up-sampling which may be implemented as a linear function or any other suitable interpolation algorithms. ⊕ is concatenation between feature maps, and that is joining two feature maps to generate a deeper feature map. This network structure includes four down-sampling and four up-sampling, but other network structures may be adopted in other embodiments.

Figure 2:
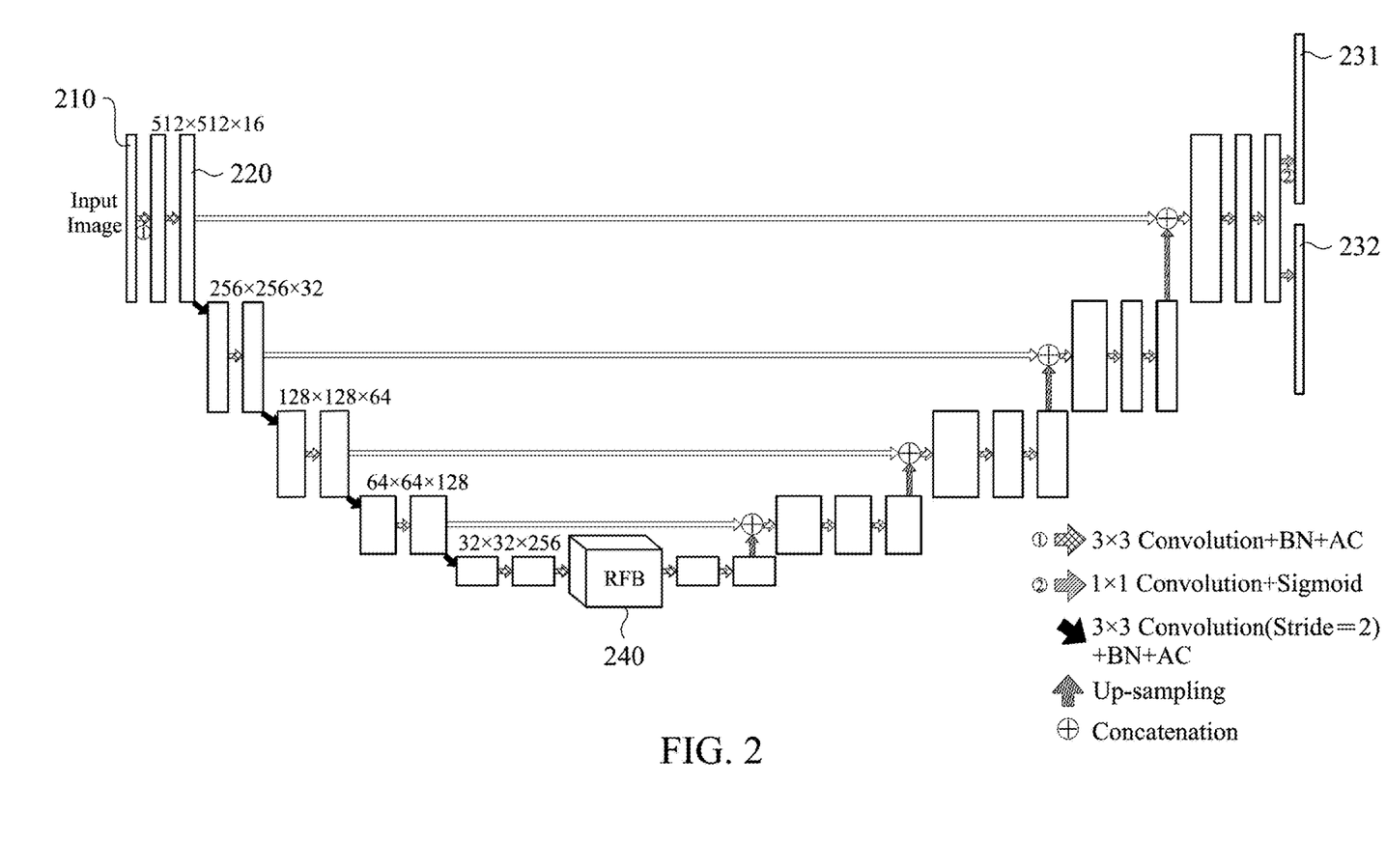
FIG. 2 is a diagram illustrating a convolutional neural network having a U-net structure in accordance with an embodiment.
Figure 3:
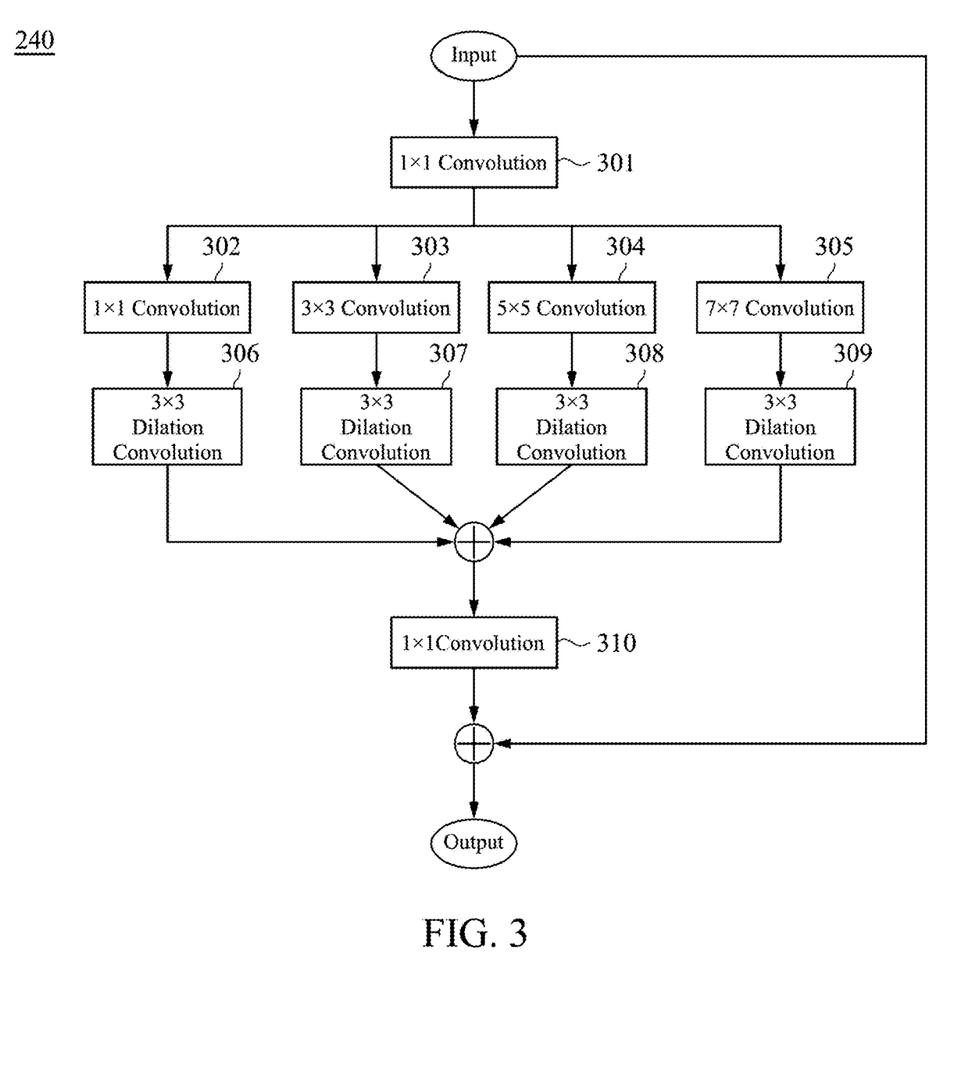
FIG. 3 is a diagram illustrating processes of a receptive field block in accordance with an embodiment.

A receptive field block (RFB) 240 is disposed at a bottom layer (i.e. smallest feature map) of the network structure. The detail of the receptive field block 240 is shown in FIG. 3. The receptive field block 240 includes convolution kernels 301-310. The input from the previous layer is processed by the convolution kernel 301 which size is 1×1, and then is processed by the convolution kernels 302-305. The size of the convolution kernel 302 is 1×1, the size of the convolution kernel 303 is 3×3, the size of the convolution kernel 304 is 5×5, and the size of the convolution kernel 305 is 7×7. The output from the convolution kernels 302-305 are then processed by the convolution kernels 306-309 respectively. In particular, the convolution kernels 306-309 are dilation convolution kernels. The dilation ratio of the convolution kernel 306 is 1, the dilation ratio of the convolution kernel 307 is 3, the dilation ratio of the convolution kernel 308 is 5, and the dilation ratio of the convolution kernel 309 is 7. The sizes of the convolution kernels 306-309 are all equal to 3×3. The detail of the dilation convolution kernels is referred to the paper Liu, Songtao, and Di Huang. "Receptive field block net for accurate and fast object detection." *Proceedings of the European Conference on Computer Vision (ECCV)*. 2018 which is incorporated by reference herein. The outputs of the convolution kernels 306-309 are concatenated, and then are processed by a convolution kernel 310.

The result of the convolution kernel 310 is concatenated with the input as the output of the receptive field block 240.

In the network structure of FIG. 2, the output includes two branches. The first branch (also referred to as a region branch) outputs the region map 231, and the second branch (also referred to as a boundary branch) outputs the boundary map 232. Different labels (i.e. ground truth) are used to train these two branches. To be specific, lipid droplet regions are manually marked in the pathological slice image. For example, doctors may draw circles for indicating where the lipid droplets are. The circles are filled, and sloid circles serves as positives. The marked pathological slice images are used to train the region branch. The labels for the boundary branch are generated by morphology processes. The ground truth of the boundary branches is written in the following Equation 1.

$$GT^B = \text{Dilate}(GT^R) - \text{Erode}(GT^R) \quad \text{[Equation 1]}$$

$GT^R$ is the marked pathological slice image. In other words, $GT^R$ is the ground truth of the region branch. Dilate(·) means a twice-repeated morphology dilation process (the size of the kernel is 3×3). Erode(·) is a twice-repeated morphology erosion process (the size of the kernel is 3×3). That is, the result of the morphology erosion process is subtracted from the result of the morphology dilation process. The difference of the two morphology processes is taken as the ground truth $GT^B$ of the boundary branch. The dilation process increases the size of the lipid droplet regions (i.e. expanding outward), the erosion process shrinks the lipid droplet regions, and thus the difference between the two processes show where the boundaries are. The advantages of the morphology processes include generating wider boundaries which provide more positive pixels during training. In some embodiments, the boundary of the lipid droplet region $GT^R$ is taken as the ground truth of the boundary branch.

The loss function of the entire network includes two portions. The first portion is a region loss, and the second portion is a boundary loss that are written in the following Equation 2.

$$L = L^R(p^R, y^R) + L^B(p^B, y^B) \quad \text{[Equation 2]}$$

L is the loss function of the entire network. $L^R$ is the loss function the region branch. $L^B$ is the loss function of the boundary branch. $p^R$ is a predicted value from the region branch, and $y^R$ is the ground truth of the region branch. $p^B$ is a predicted value of the boundary branch, and $y^B$ is the ground truth of the boundary branch. In some embodiments, the loss function of the region branch is defined as the following Equations 3-8.

$$L^R(p, y) = \quad \text{[Equation 3]}$$
$$\lambda_a L_{BCE}(p, y) + \lambda_b L_{tversky(0.5, 0.5)}(p, y) + \lambda_c L_{activeContour}(p, y)$$

$$L_{BCE}(p, y) = -(y\log(p) + (1-y)\log(1-p)) \quad \text{[Equation 4]}$$

$$L_{tversky(\alpha, \beta)}(p, y) = 1 - \frac{py + \epsilon}{py + \alpha p(1-y) + \beta(1-p)y + \epsilon} \quad \text{[Equation 5]}$$

$$L_{activeContour}(p, y) = L_{length}(p) + \lambda L_{region}(p, y) \quad \text{[Equation 6]}$$

$$L_{length}(p) = \sqrt{\nabla p_x^2 + \nabla p_y^2} \quad \text{[Equation 7]}$$

$$L_{region}(p, y) = \mu p(y-1)^2 + (1-p)y^2 \quad \text{[Equation 8]}$$

p is the output value from the region branch, y is the corresponding ground truth. $\lambda_a$, $\lambda_b$, and $\lambda_c$, are real numbers which may be determined by experiments. Equation 4 represents a binary cross-entropy loss which has the problem of unbalance between the foreground and background, and hence the background is selected with greater probability as the ground truth.

In the Equation 5, two parameters $\alpha$, $\beta$ of the loss $L_{tversky(\alpha,\beta)}$ are used to adjust false positive (FP) and false negative (FN). When training the region branch, the two parameters $\alpha$, $\beta$ are set to be 0.5. This gives equal weight to FP and FN. $\epsilon$ is a very small value used to prevent division by zero.

In the Equations 6-8, the loss $L_{activeContour}(p,y)$ does not yield a better training performance but produces better visual effect. $\nabla p_x^2$, $\nabla p_y^2$ are the derivatives of the predicted value p along the x-axis and y-axis, respectively. $\lambda$, $\mu$ are real numbers that may be determined by experiments. The loss $L_{length}(p)$ in the Equation 7 is deemed as a penalty related to the length of the contour to train the model to produce complete objects with less fragmentation.

On the other hand, the loss function of the boundary branch is defined as the following Equation 9 where $\lambda_d$, $\lambda_e$ are real numbers determined by experiments.

$$L_B(p,y)=\lambda_d L_{BCE}(p,y)+\lambda_e L_{tversky(0.1,0.9)}(p,y) \quad \text{[Equation 9]}$$

In contrast to the region branch, more emphasis on false negatives are required for the boundary branch. There are two reasons. The first reasons is associated with the data characteristics. Compared to the regions, the boundaries are more sparse, which makes the model tend to predict conservatively. The model needs additional motivation to guess non-existent boundaries from the original input image. The second reason is related to the proposed method. If too many FNs are predicted in the boundary branch, the connected lipid droplets may not be separated. By contrast, if too many FPs are generated in the boundary branch, due to the emphasis on FN, the large number of FPs may not necessarily have a negative impact on the final result. Therefore, $\alpha$ is set to 0.1, and is set to 0.9 to reduce FN in the loss function $L_{tversky(\alpha,\beta)}$ when calculating boundary loss.

Figure 4:
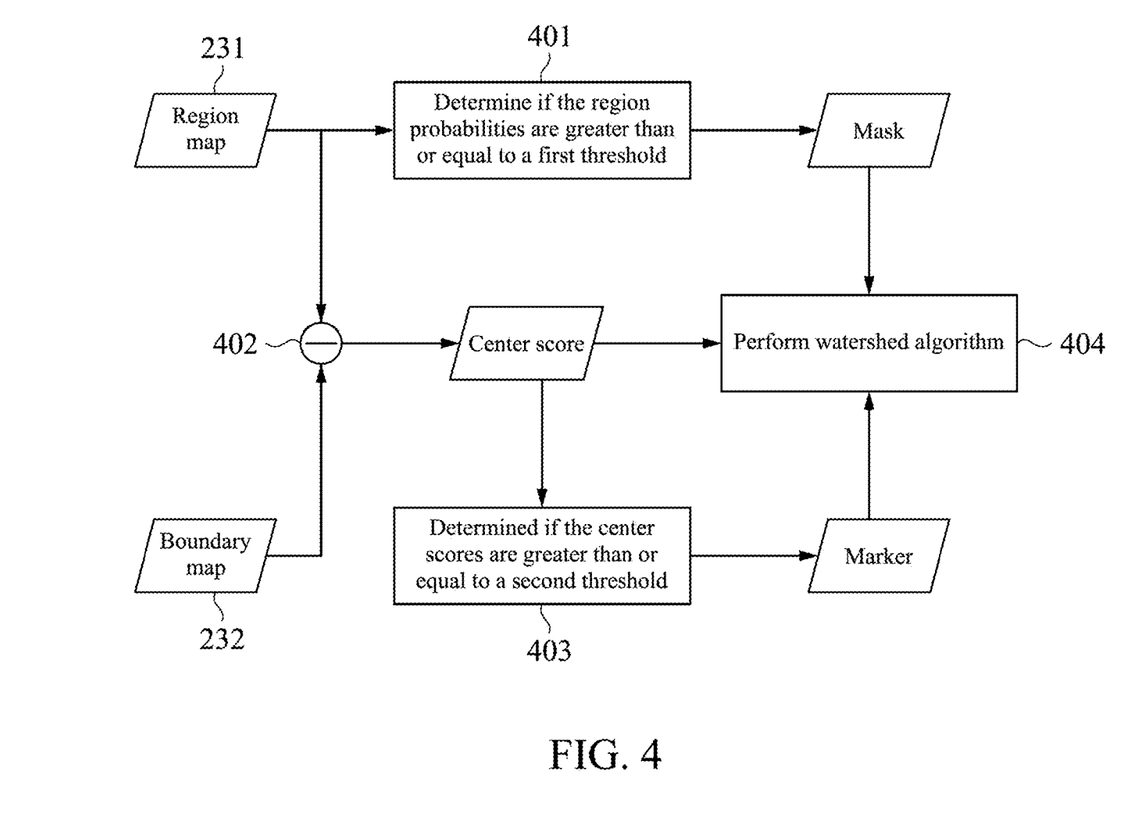
FIG. 4 is a flow chart of a watershed algorithm in accordance with an embodiment.

Next, in step 102 of FIG. 1, the lipid droplets are segmented from the pathological slice image according to the region probabilities and the boundary probabilities. In some embodiments, a watershed algorithm is performed in the step 102. In brief, the watershed algorithm treats the entire image as a ground surface with gradients, and then different types of water are injected in different places and flow to low-lying places. The water will gradually rise until a masked area is filled. The original image is segmented into different types of water, which represent the segmentation results. As a result, every segmented object (i.e. lipid droplet) has exactly one pixel width of division line. The detail flow chart of the watershed algorithm is illustrated in FIG. 4.

A mask is first calculated to indicate the location where the lipid droplets may locate (two lipid droplet may be connected). Meanwhile, the water of the watershed algorithm only raises in the region defined by the mask. In step 401, it is determined if the region probabilities are greater than or equal to a first threshold, and the pixel in the respective location of the mask is equal to "1" if yes, otherwise "0" as written in the following Equation 10.

$$\text{Mask} = \begin{cases} 1, & p^r \geq \tau \\ 0, & \text{else} \end{cases} \quad \text{[Equation 10]}$$

Figure 5:
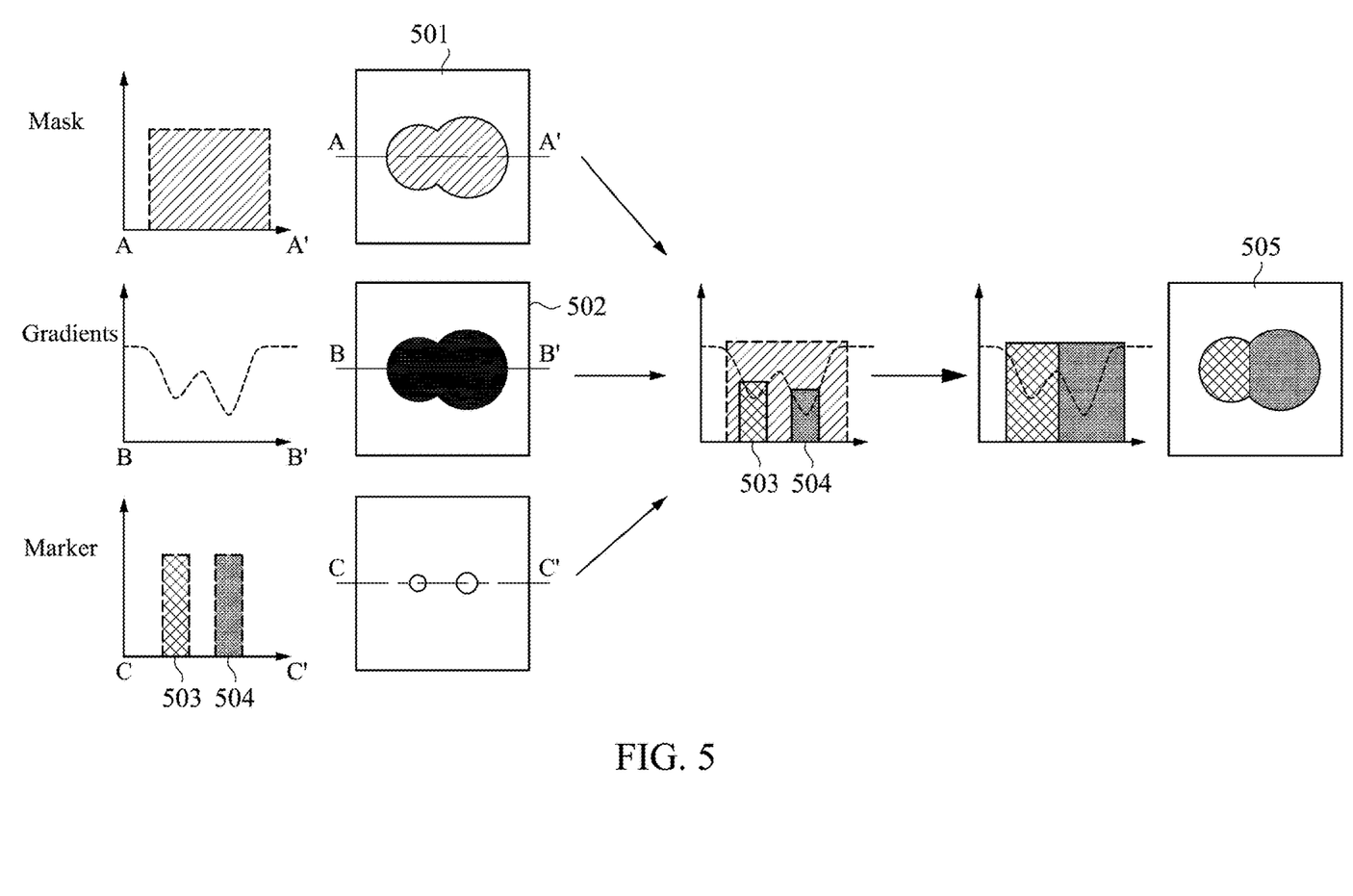
FIG. 5 is a diagram illustrating the mask, gradients and markers in the watershed algorithm in accordance with an embodiment.

$\tau$ is the first threshold. Mask are pixels of the mask. FIG. 5 is a diagram illustrating the mask, gradients and markers in the watershed algorithm in accordance with an embodiment. Referring to FIG. 4 and FIG. 5, a mask 501 contains two connected lipid droplets. The diagram on the left-hand side of the mask 501 shows the value (1 or 0) along a line AA' of the mask 501. On the other hand, the mask 501 represents a result from a naive segmentation algorithm using a fixed threshold to generate a binary map of foreground (i.e. lipid droplet). However, this kind of foreground will contain more than one connected lipid droplet, and thus the watershed algorithm is needed for further segmentation.

The division line between objects always occurs at high gradients in the watershed algorithm, and thus appropriate gradients should be calculated. In step 402, the boundary probability $p^b$ is subtracted from the region probability $p^r$ at the same location to calculate a center score $p^c$ which is a probability of the pixel located at the center of the lipid droplet. When the model predicts a high region probability and a low boundary probability, it means the corresponding pixel may be far from the boundary of the lipid droplet. If the region probability and the boundary probability are both high, the corresponding pixel is probably located close to the border between two lipid droplets. The negative number of the center score is taken as the gradient. In other words, the center of the lipid droplet will have low gradients. The detail calculation is written in the following Equations 11 and 12.

$$\text{Gradient}=-p^c \quad \text{[Equation 11]}$$

$$p^c=p^r-p^b \quad \text{[Equation 12]}$$

A gradient map 502 is shown in FIG. 5. The diagram on the left-hand side of the gradient map 502 shows the values of the gradients along a line BB'. In this example, the gradients gradually lower toward the center of the lipid droplets to form two depressions.

In step 403, it is determined if the center scores are greater than or equal to a second threshold to generate multiple markers defined in the following Equation 13.

$$\text{Marker} = \begin{cases} 1, & p^c \geq \tau^c \\ 0, & \text{else} \end{cases} \quad \text{[Equation 13]}$$

$\tau^c$ is the second threshold. The marker indicates the beginning point where water raises. When the center score is larger, the corresponding pixel is more likely to be in the center of the lipid droplet. The water will rise from the center of the lipid droplet to form a division line between two lipid droplets. There may be more than one pixels whose center scores are greater than the second threshold. Some of the pixels may be connected to each other, and thus the connected pixels are taken as the same kind of water (i.e. belong to the same marker). In the example of FIG. 5, two markers 503 and 504 are generated.

In step 404, the watershed algorithm is performed according to the mask, the gradients and the markers. That is, different kinds of water raises from the respective marker in the range of the mask, and then they meet each other at high gradients to form a division line. A segmentation result 505 is shown in FIG. 5 in which two originally connected lipid droplets are separated.

In principle, if the region probability $p^r$ and the boundary probability $p^b$ are both high, it is more likely at the middle between two connected lipid droplet. In some embodiments, the center scores $p^c$ are used to segment the lipid droplets in step 102. For example, it is determined if the center score $p^c$ is greater than a threshold, and the corresponding pixel is the foreground if the determination is affirmative, otherwise is the background. In other embodiments, any types of difference such as square difference, absolute difference between the region probability $p^r$ and the boundary probability $p^b$ is calculated as the center score $p^c$. In some embodiments, the product or sum of the region probability $p^r$ and the boundary probability $p^b$ is calculated and then compared to a threshold to determine the foreground. People in the art should be able to devise other approaches based on the disclosure above, and the step 102 is not limited thereto.

The deep learning model may have some problems when the lipid droplets are segmented. There are three situations. First, some areas which are not lipid droplets but have a shape similar to lipid droplets. Second, during the WSI manufacturing process, some physical damage may occur to the slide, which may affect the area of the slide containing the lipid droplets such that they cannot be fully recognized and labeled by humans for the training and evaluation process. Third, some inputs rarely appear in the training set and may therefore generate noise predictions. All these situations may result in broken region mask. A boundary score is proposed in the embodiment to quantify the object uncertainty. Referring to step 103 of FIG. 1, a boundary score of each lipid droplet is calculated according to the boundary probabilities. Some lipid droplets may be deleted according to the boundary scores which are defined in the following Equation 14.

$$BMS = \frac{1}{|C|} \sum_{(i,j) \in C} p^b_{(i,j)} \qquad \text{[Equation 14]}$$

Figure 6:
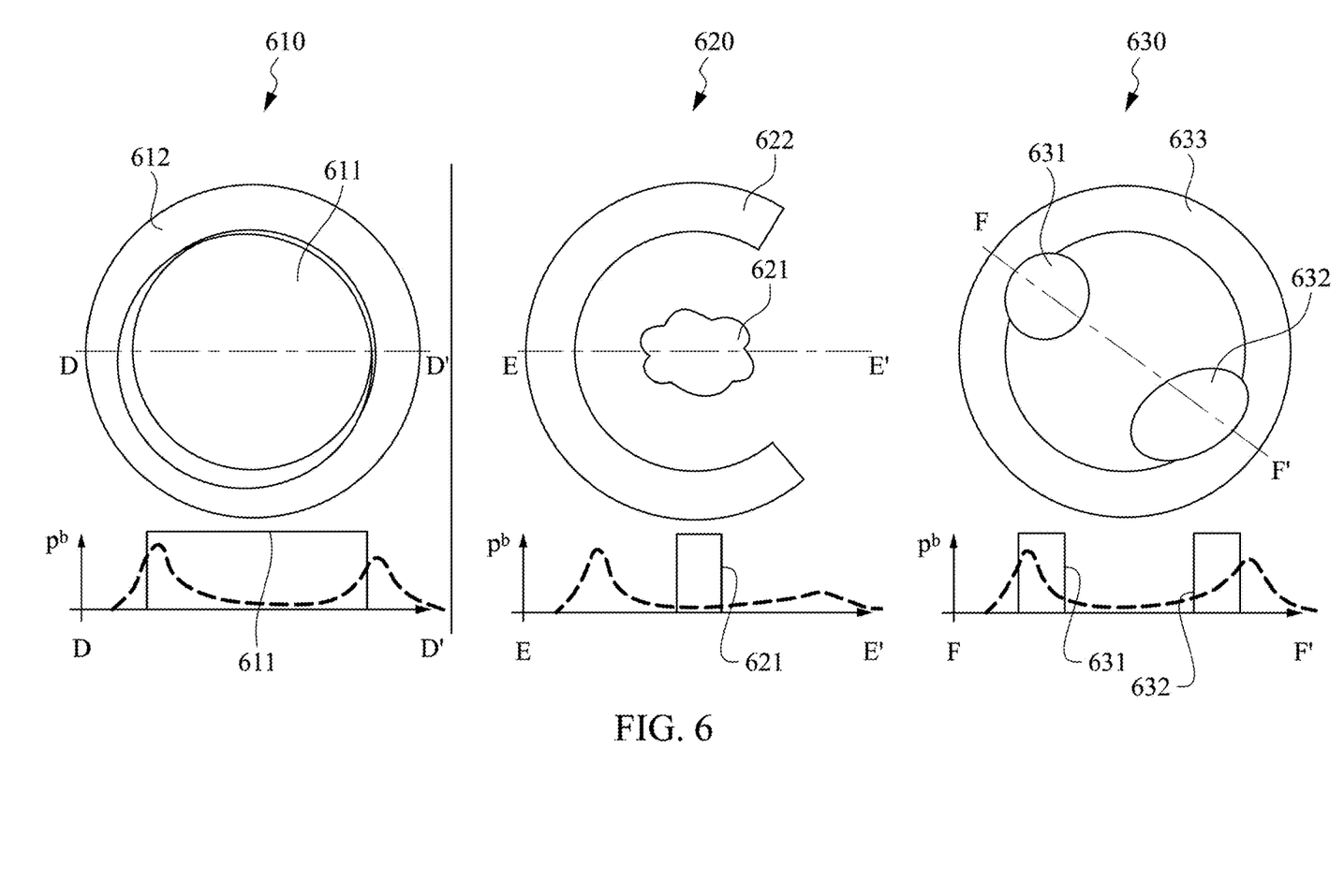
FIG. 6 is a diagram illustrating deletion of the lipid droplet in accordance with an embodiment.

BMS is the boundary score. $p_{(i,j)}^b$ is the boundary probability at coordinates (i,j). C is the set of pixels in one lipid droplet extracted from the watershed algorithm. From another aspect, the Equation 14 calculates the average of the boundary probabilities in one lipid droplet as a corresponding boundary score. If the boundary score is less than the third threshold, the corresponding lipid droplet is deleted. FIG. 6 is a diagram illustrating deletion of the lipid droplet in accordance with an embodiment. Three situations 610, 620, and 630 are illustrated in FIG. 6. Detected lipid droplet regions 611, 621, 631, and 632 and regions 612, 622, and 633 with high boundary probabilities are illustrated in the upper panel. The boundary probabilities $p^b$ along cross-sectional lines DD', EE', and FF' are illustrated in the bottom panel. The situation 610 is the correct detection of the lipid droplet in which lipid droplet region 611 is surrounded by the region 612. The situations 620 and 630 are false detection. The lipid droplet region 621 is narrower, and the region 622 is not complete. In the situation 630, the lipid droplet regions 631 and 632 only cover a small portion of the region 633. The boundary score calculated in the situation 610 is relatively higher, and the boundary scores for the situations 620 and 630 are relatively lower. The false detection of the situations 620 and 630 is deleted by comparing the boundary score to the third threshold.

Figure 7:
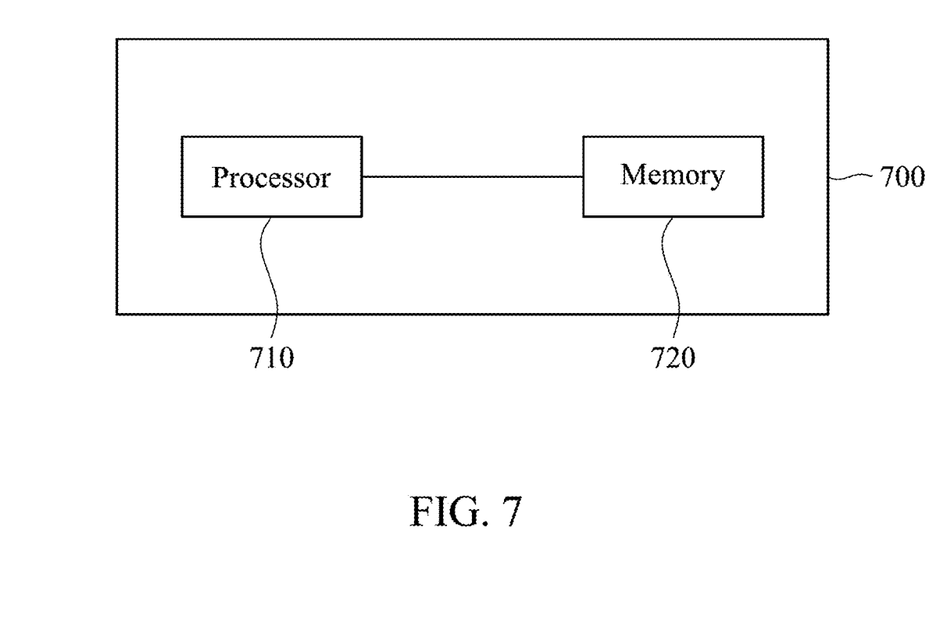
FIG. 7 is a diagram of an electrical device in accordance with an embodiment.

FIG. 7 is a diagram of an electrical device in accordance with an embodiment. Referring to FIG. 7, an electrical device 700 is provided to perform the method of FIG. 2. The electrical device 700 includes a processor 710 and a memory 720. The processor 710 may be a central processing unit, a graphical processing unit, a microprocessor, a microcontroller, an image processing chip, an application-specific integrated circuit, etc. The memory 720 may be a random access memory, a read-only memory, a flash memory, floppy disks, hard disks, CD-ROMs, pen drives, tapes, databases accessible via the Internet. The memory 720 stores instructions that are executed by the processor 710 to perform the method of FIG. 1. From another aspect, a non-transitory computer readable storage media is provided. For example, the media may be a random access memory, a read-only memory, a flash memory, floppy disks, hard disks, CD-ROMs, pen drives, tapes, databases accessible via the Internet for storing instructions which are configured to be executed by a computer system to perform the method of FIG. 1.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A segmenting method for a pathological slice image, wherein the method is performed by a computer system and comprises:
   inputting the pathological slice image into a machine learning model to output a region map and a boundary map with respect to a plurality of lipid droplets, wherein the region map comprises a plurality of region probabilities, and the boundary map comprises a plurality of boundary probabilities; and
   segmenting the lipid droplets from the pathological slice image according to the region probabilities and the boundary probabilities.

2. The segmenting method of claim 1, wherein the machine learning model is a convolutional neural network having a U-net structure, and the U-net structure comprises down-sampling and up-sampling,
   wherein the convolutional neural network comprises a receptive field block at a bottom layer of the U-net structure, the receptive field block comprises a plurality of convolution kernels, and at least one of the convolution kernels is a dilation convolution kernel.

3. The segmenting method of claim 2, wherein the machine learning model comprises a first branch for outputting the region map and a second branch for outputting the boundary map, and the method further comprising:
   using a marked pathological slice image to train the first branch; and
   calculating a result of a morphology dilation process of the marked pathological slice image minus a result of a morphology erosion process of the marked pathological slice image to train the second branch.

4. The segmenting method of claim 1, wherein the step of segmenting the lipid droplets from the pathological slice image comprises:
   determining if the region probabilities are greater than or equal to a first threshold to generate a mask;
   using the boundary probabilities and the region probabilities at respective same locations to calculate a plurality of center scores and gradients;
   generating a plurality of markers based on the center scores; and performing a watershed algorithm according to the mask, the gradients, and the markers.

5. The segmenting method of claim 1, further comprising:
calculating an average of the boundary probabilities within one of the lipid droplets as a boundary score of the one of the lipid droplets; and
deleting the one of the lipid droplets if the boundary score is less than a third threshold.

6. An electrical device comprising:
a memory configured to store a plurality of instructions; and
a processor configured to execute the instructions to perform a plurality of steps:
inputting a pathological slice image into a machine learning model to output a region map and a boundary map with respect to a plurality of lipid droplets, wherein the region map comprises a plurality of region probabilities, and the boundary map comprises a plurality of boundary probabilities; and
segmenting the lipid droplets from the pathological slice image according to the region probabilities and the boundary probabilities.

7. The electrical device of claim 6, wherein the machine learning model is a convolutional neural network having a U-net structure, and the U-net structure comprises down-sampling and up-sampling,
wherein the convolutional neural network comprises a receptive field block at a bottom layer of the U-net structure, the receptive field block comprises a plurality of convolution kernels, and at least one of the convolution kernels is a dilation convolution kernel.

8. The electrical device of claim 7, wherein the machine learning model comprises a first branch for outputting the region map and a second branch for outputting the boundary map, and the steps further comprise:
using a marked pathological slice image to train the first branch; and
calculating a result of a morphology dilation process of the marked pathological slice image minus a result of a morphology erosion process of the marked pathological slice image to train the second branch.

9. The electrical device of claim 6, wherein the step of segmenting the lipid droplets from the pathological slice image comprises:
determining if the region probabilities are greater than or equal to a first threshold to generate a mask;
using the boundary probabilities and the region probabilities at respective same locations to calculate a plurality of center scores and gradients;
generating a plurality of markers based on the center scores; and
performing a watershed algorithm according to the mask, the gradients, and the markers.

10. The electrical device of claim 6, further comprising:
calculating an average of the boundary probabilities within one of the lipid droplets as a boundary score of the one of the lipid droplets; and
deleting the one of the lipid droplets if the boundary score is less than a third threshold.

11. A non-transitory computer readable storage media storing a plurality of instructions which are configured to be executed by a computer system to perform a plurality of steps:
inputting a pathological slice image into a machine learning model to output a region map and a boundary map with respect to a plurality of lipid droplets, wherein the region map comprises a plurality of region probabilities, and the boundary map comprises a plurality of boundary probabilities; and
segmenting the lipid droplets from the pathological slice image according to the region probabilities and the boundary probabilities.

12. The non-transitory computer readable storage media of claim 11, wherein the machine learning model is a convolutional neural network having a U-net structure, and the U-net structure comprises down-sampling and up-sampling,
wherein the convolutional neural network comprises a receptive field block at a bottom layer of the U-net structure, the receptive field block comprises a plurality of convolution kernels, and at least one of the convolution kernels is a dilation convolution kernel.

13. The non-transitory computer readable storage media of claim 12, wherein the machine learning model comprises a first branch for outputting the region map and a second branch for outputting the boundary map, and the steps further comprise:
using a marked pathological slice image to train the first branch; and
calculating a result of a morphology dilation process of the marked pathological slice image minus a result of a morphology erosion process of the marked pathological slice image to train the second branch.

14. The non-transitory computer readable storage media of claim 11, wherein the step of segmenting the lipid droplets from the pathological slice image comprises:
determining if the region probabilities are greater than or equal to a first threshold to generate a mask;
using the boundary probabilities and the region probabilities at respective same locations to calculate a plurality of center scores and gradients;
generating a plurality of markers based on the center scores; and
performing a watershed algorithm according to the mask, the gradients, and the markers.

15. The non-transitory computer readable storage media of claim 11, further comprising:
calculating an average of the boundary probabilities within one of the lipid droplets as a boundary score of the one of the lipid droplets; and
deleting the one of the lipid droplets if the boundary score is less than a third threshold.

* * * * *